United States Patent Office 2,842,600
Patented July 8, 1958

2,842,600

SYNTHESIS OF VITAMIN A ESTERS AND ETHERS

William Oroshnik, Plainfield, N. J., and Alexander D. Mebane, New York, N. Y., assignors to Ortho Pharmaceutical Corporation, a corporation of New Jersey No Drawing. Application June 19, 1956
Serial No. 592,251

11 Claims. (Cl. 260—611)

This invention relates to compositions of matter and to methods for preparing the same and particularly relates to a process for the preparation of vitamin A ethers and esters and to compositions of matter which are intermediates in the process.

The present application is a continuation-in-part of application Serial No. 343,784, filed March 20, 1953.

It is an object of this invention to prepare compounds to be used in the preparation of vitamin A and its derivatives.

It is another object of this invention to provide a process for the preparation of vitamin A and its derivatives.

Other objects of this invention will be apparent from the description following and the appended claims.

It has now been discovered that ethers and esters of vitamin A may be prepared from a compound having the following formula:

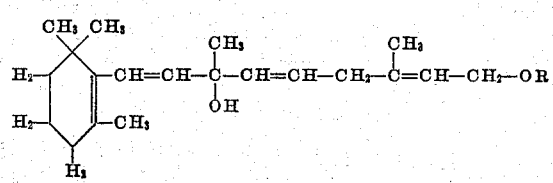

Compound I in which R is a lower alkyl radical. The preparation and properties of Compound I are given by William Oroshnik, G. Karmas, and A. D. Mebane, Journal of the American Chemical Society, volume 74, page 295 (1952).

The treatment of Compound I with a metallic amide results in a loss of alcohol and the formation of Compound II having the formula

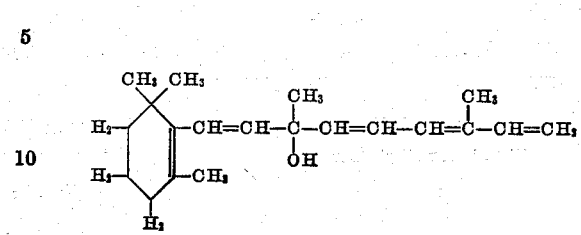

Compound II

Although sodamide in liquid ammonia is the preferred reagent for use in the conversion of Compound I to Compound II, any metallic amide, such as the alkali metal amides, i. e., potassium and lithium amides, and the alkaline earth amides, i. e., calcium amide; and other solvents such as ether, and pyridine or other nitrogenous solvents may also be used.

Compound II, in the presence of strong or weak acids or Lewis acids of which boron trifluoride is preferred, may undergo the allylic rearrangement-dehydration illustrated in Table I to give anhydrovitamin A, identical in every way with that formed from vitamin A itself. Under carefully controlled conditions of acidity, it is possible to isolate the intermediate Compounds III and IV shown in Table I. If the rearrangement is done in methanol, the intermediate compound may be a tertiary methoxyl Compound III, and if the rearrangement is carried out in aqueous media, the rearrangement product may be a hydroxyl Compound IV. These rearrangement products can react in either or both of two ways: (1) Compound III can rearrange to vitamin A methyl ether in methanol, or (2) it can lose the elements of methanol to form a 2'–3' double bond in the ring, giving anhydrovitamin A.

The intermediate compound IV can rearrange to vitamin A or vitamin A esters (in the presence of organic acids) by Reaction 1; or Compound IV can also dehydrate to anhydrovitamin A by Reaction 2. The rearrangement of Compounds III and IV may be carried out to advantage under conditions where the acidity is not too strong. By the use of methanol or aqueous tertiary butanol as a solvent and the presence of catalytic quantities of boron trifluoride, which acts as an acid in these media, one can obtain vitamin A ethers or vitamin A alcohol.

TABLE I

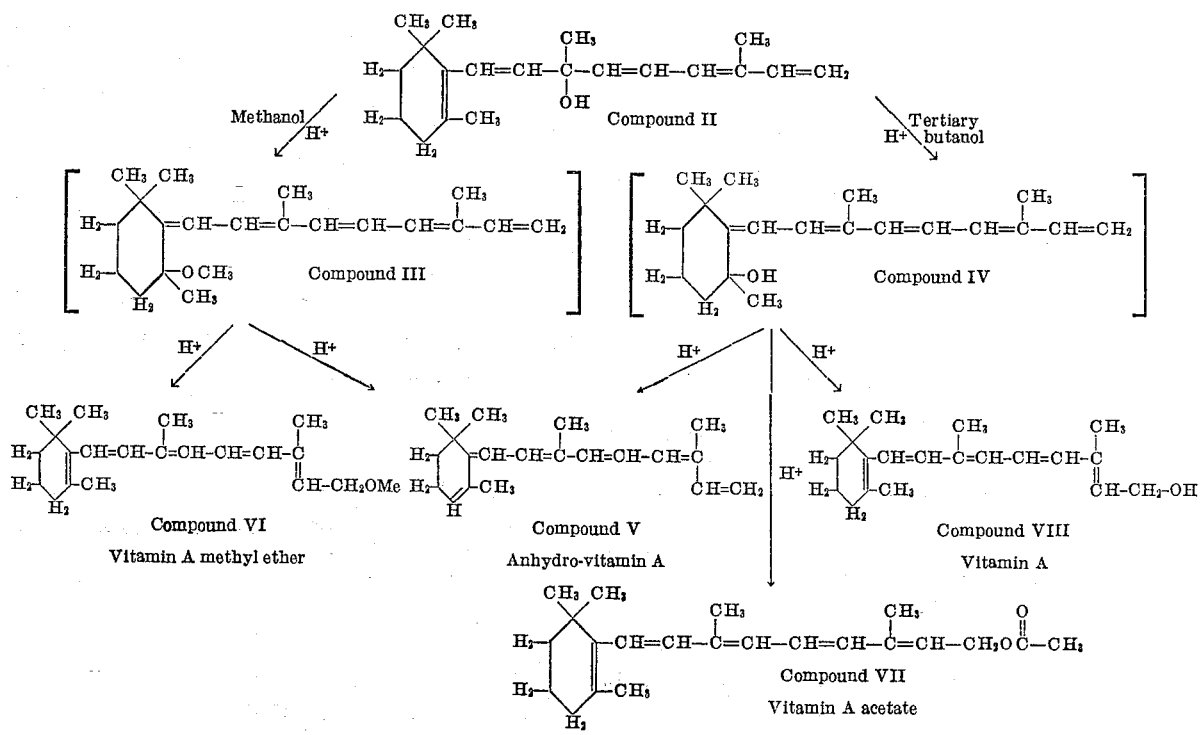

Example I

PREPARATION OF COMPOUND II

A solution of sodamide in liquid ammonia was prepared by adding 9.2 grams of metallic sodium to one liter of liquid ammonia to which had been previously added 0.2–0.5 gram of hydrated ferric nitrate. After all the sodium had reacted the solution was cooled to −40° C. and a solution of 34.0 grams of Compound I in 275 milliliters of anhydrous ether was added during ten to twenty minutes. The reaction mixture turned a brilliant ultramarine blue and remained thus for the duration of the reaction period which was two hours at −30° C. The reaction was stopped by the addition of excess ammonium chloride and the ammonia allowed to evaporate. The remaining ether solution was removed and distilled. The product was collected at 95° C. at 0.001 millimeter of mercury pressure. It was arbitrarily cut into two fractions in order to concentrate the demethoxylated portion as much as possible. Both fractions consisted essentially of Compound II. The first fraction which weighed 20.1 grams had a refractive index at 22° C. of 1.5462 and showed absorption in the ultraviolet with a maximum at 2740 A. The first fraction was found to have a methoxyl value of 1.9%. The second fraction which weighed 3.7 grams had a refractive index at 22° C. of 1.5362 and showed absorption in the ultraviolet with a maximum at 2740 A. This fraction had a methoxyl value of 4.1%. Both fractions were purified chromatographically on an alumina column and the product obtained had a refractive index at 23.5° C. of 1.5509 and showed absorption in the ultraviolet with a maximum at 2750 A. and a molecular coefficient of extinction ($\epsilon$) of 31,700. The calculated values for carbon and hydrogen were 83.86% and 10.56% respectively. Analysis showed 83.56% carbon and 10.55% hydrogen.

Example II

PREPARATION OF INTERMEDIATE COMPOUND III

A solution of 1.6 grams of Compound II and a few crystals of hydroquinone in 320 milliliters of methanol from which the air had been removed by alternatingly evacuating and flushing with nitrogen, was cooled to −15° C. and treated with two drops of boron trifluoride etherate. The reaction was stopped after 25 seconds by adding enough ammonium hydroxide (5 drops) to neutralize all of the acid. The ultraviolet absorption spectrum of Compound II was absent, but the spectrum showed peaks at 326, 342.5, and 360.5 m$\mu$, due to the presence of Compound III. The tertiary-methoxyl compound III (Table I) was isolated as follows: The methanol solvent was evaporated under vacuum and the residue dissolved in a small quantity of petroleum ether (60–100 ml.) and chromatographed on alumina. The adsorbed compound, appearing as a white-fluorescent zone, was eluted by 2% ether-pentane mixture. The eluate on concentration under vacuum (removing the last traces of volatiles at 0.001 millimeters) was a lemon-yellow oil (0.54 g.) with the following properties:

*Analysis.*—Calc'd. for $C_{21}H_{32}O$: C, 83.94; H, 10.73; OMe, 10.3. Found: C, 83.73; H, 10.85; OMe, 10.99. $\lambda\lambda 326, 342.5, 360.5$ m$\mu$;

$$\epsilon_{max.}^{342.5} \ 44,200$$

The infrared spectrum proved the presence of a terminal vinyl group (strong band at 11.17$\mu$) and a tertiary-methoxyl group (strong band at 9.3$\mu$). The terminal vinyl group was corroborated by ozonization, which gave 51% of formaldehyde.

Example III

A solution of 1.0 g. of Compound II in 50 ml. of 80% tertiary-butanol-20% water was chilled to the freezing point and treated with 1 drop of boron trifluoride etherate. The mixture was stirred while allowing to melt, then stored at −5° C. After an hour, the absorption spectrum, $\lambda\lambda_{max}328, 343.5, 362$ m$\mu$, showed that the mixture consisted principally of Compound IV.

Example IV

A solution of 2 g. of Compound II and a few hydroquinone crystals in 150 ml. of benzene was refluxed under a water separator. Twenty-five milligrams of p-toluenesulphonic acid monohydrate was added. Within 15 minutes, the theoretical quantity of water had been collected. The solution was cooled with ice under a protective stream of nitrogen, extracted with potassium bicarbonate solution sufficient to make alkaline, then dried over anhydrous $K_2CO_3$ and concentrated under vacuum to an orange oil, which crystallized on standing in the cold. The absorption spectrum showed pure anhydrovitamin A: $\lambda\lambda_{max}$351, 368, 390.

*Example V*

A solution of 3 grams of Compound II and a few hydro-quinone crystals in 900 cc. of methanol was chilled to $-25°$ C. and treated with a solution of 3 drops of boron trifluoride etherate in 100 cc. of methanol. After storage for 19 hours at 5° C., the absorption spectrum showed a vitamin A methyl ether (VI), accompanied by some anhydrovitamin A (V). The acid was neutralized with 9 drops of 28% ammonium hydroxide, and the solution was evaporated under vacuum to one-twentieth its original volume, then extracted with isoheptane and the extract dried over anhydrous $K_2CO_3$ and chromatographed on activated alumina. After elution of anhydrovitamin A with isoheptane, the column was extruded. The main yellow-fluorescing zone was extracted with methanol and the methanol extract evaporated under vacuum, yielding 1.2 g. (37%) of vitamin A methyl ether, a yellow oil, $\lambda_{max}$326 m$\mu$.

*Example VI*

A solution of 1.0 g. of Compound II in 50 ml. of acetonitrile was added rapidly with stirring to 100 ml. of 95% acetic acid-5% water. A transient blue color was noted, which disappeared in a few seconds. Five grams of potassium acetate were then added. The absorption spectrum of the solution showed vitamin A acetate (VII) together with a considerable quantity of anhydrovitamin A (V). These could readily be separated by chromatography on alumina.

*Example VII*

A solution of Compound IV, prepared as described in Example III, was allowed to stand at $-5°$ C. for 20 hours. At the end of this time, its absorption spectrum showed that it contained vitamin A (VIII) together with a considerable quantity of anhydrovitamin A (V). These could readily be separated by chromatography on alumina.

What is claimed is:

1. The method comprising treating a compound of the formula

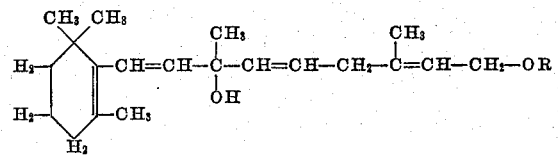

in which R is a lower alkyl radical, with a metallic amide selected from the group consisting of alkali and alkaline earth metallic amides to provide a pentaene of the formula

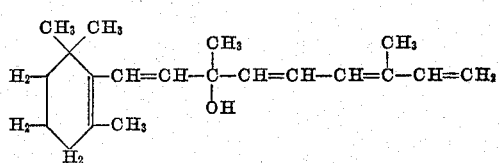

and treating the pentaene, in the presence of a compound selected from the class consisting of low-molecular-weight aliphatic alcohols and acids, with a dehydrating agent to provide a member of the class consisting of vitamin A, anhydrovitamin A, low-molecular-weight aliphatic ethers of vitamin A and low-molecular-weight aliphatic esters of vitamin A.

2. The method comprising treating a compound of the formula

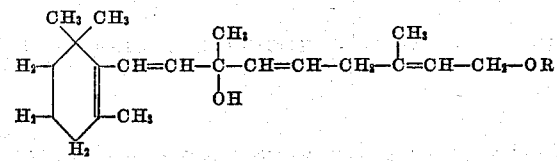

in which R is a lower alkyl radical, with a metallic amide selected from the group consisting of alkali and alkaline earth metallic amides to provide a pentaene of the formula

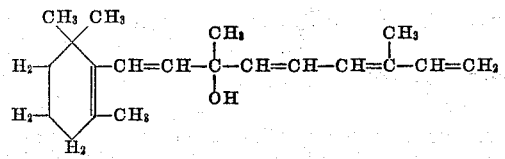

and treating the pentaene with an acid dehydrating agent to provide anhydrovitamin A.

3. A method according to claim 1 in which the dehydrating agent is boron trifluoride etherate.

4. A method comprising treating a compound of the formula

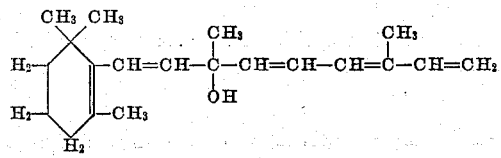

with a dehydrating agent at a temperature below room temperature in the presence of a compound selected from the class consisting of low-molecular-weight aliphatic alcohols and acids to provide a compound selected from the group consisting of vitamin A, anhydrovitamin A, aliphatic ethers of vitamin A, and aliphatic esters of vitamin A.

5. A method according to claim 4 in which the dehydrating agent is a low-molecular-weight fatty acid.

6. The method comprising treating a compound of the formula

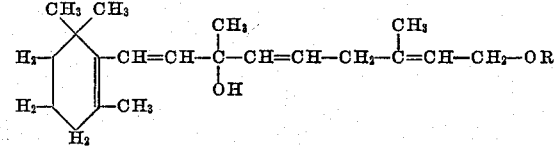

in which R is a lower alkyl radical, with a metallic amide selected from the group consisting of alkali and alkaline earth metallic amides to provide a pentaene of the formula

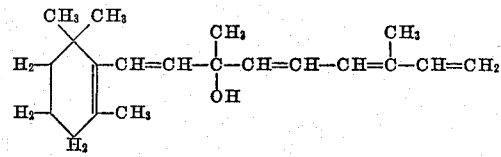

and treating the pentaene with an acid dehydrating agent in the presence of methanol to provide an intermediate having the formula

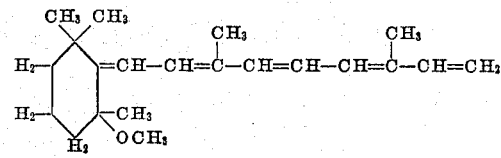

7. The method comprising treating a compound of the formula

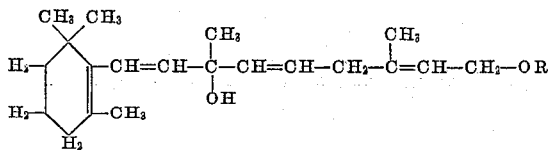

in which R is a lower alkyl radical, with a metallic amide selected from the group consisting of alkali and alkaline earth metallic amides to provide a pentaene of the formula

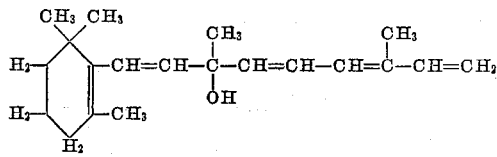

and treating the pentaene with an acid dehydrating agent in the presence of tertiary butanol to provide an intermediate having the formula

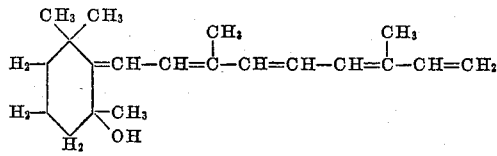

8. The method comprising treating a compound of the formula

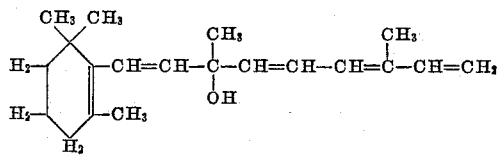

with an acid dehydrating agent in the presence of methanol to provide an intermediate having the formula

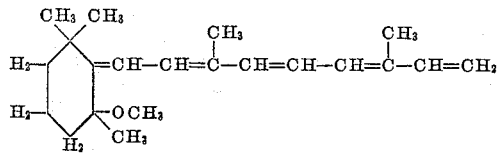

9. The method comprising treating a compound of the formula

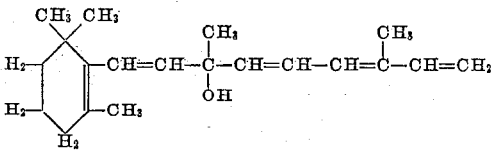

with an acid dehydrating agent in the presence of tertiary butanol to provide an intermediate having the formula

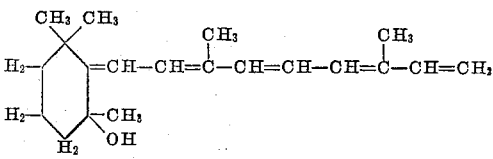

10. A compound having the formula

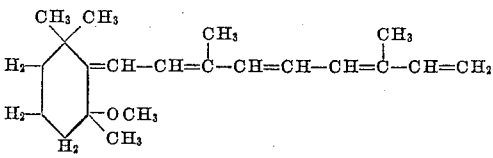

11. A compound having the formula

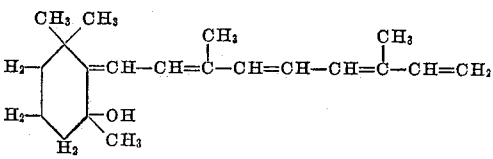

References Cited in the file of this patent

UNITED STATES PATENTS 2,587,457    Freed _____ Feb. 26, 1952

OTHER REFERENCES

Shantz et al.: J. Amer. Chem. Soc., vol. 65, pages 901–6 (1943).

Mitchell et al.: Organic Analysis, vol. I, 1953, page 51.

UNITED STATES PATENT OFFICE

CERTIFICATE OF CORRECTION

Patent No. 2,842,600                          July 8, 1958

William Oroshnik et al.

It is hereby certified that error appears in the printed specification of the above numbered patent requiring correction and that the said Letters Patent should read as corrected below.

Column 4, line 45, for "(60-100 ml.)" read -- (50-100 ml.) --;

column 4, line 71, for "A solution of 2 g." read -- A solution of 20 g. --.

Signed and sealed this 9th day of September 1958.

(SEAL)
Attest:

KARL H. AXLINE                                         ROBERT C. WATSON
Attesting Officer                                    Commissioner of Patents